Dec. 25, 1951   J. C. HOOVER   2,580,227
GAUGE
Filed July 5, 1946
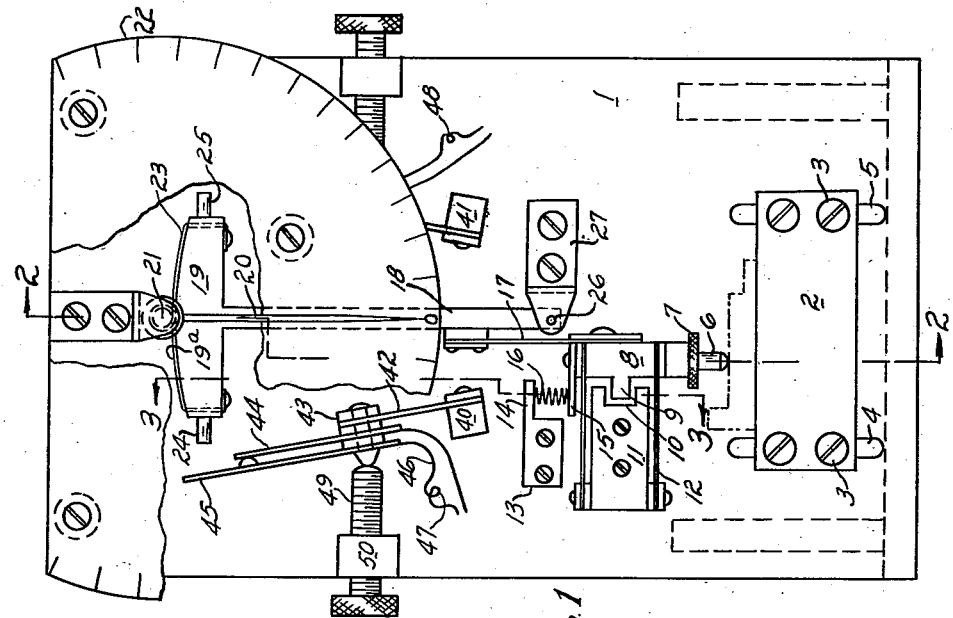
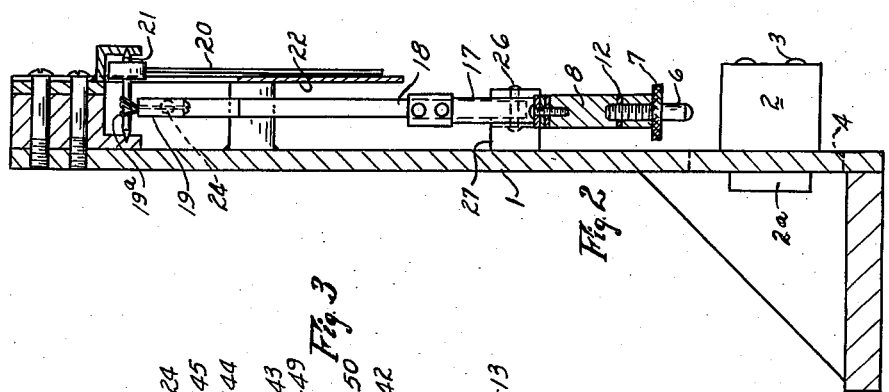
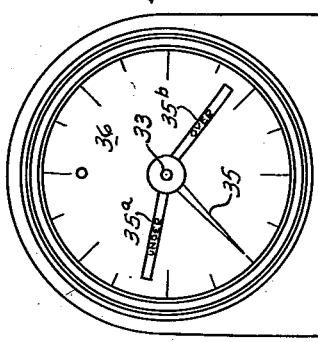
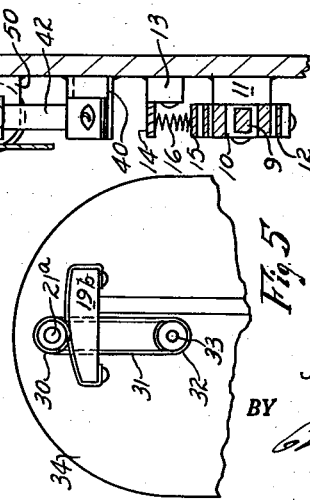
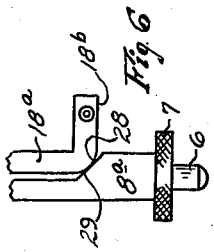
INVENTOR.
JOSEPH. C. HOOVER
BY
ATTORNEY.

Patented Dec. 25, 1951

2,580,227

UNITED STATES PATENT OFFICE 2,580,227

GAUGE

Joseph C. Hoover, Detroit, Mich.

Application July 5, 1946, Serial No. 681,484

1 Claim. (Cl. 33—148)

This invention relates to gauges, the purpose being to provide a new and useful form and arrangement of parts utilizable in determining the thickness of formed parts, this application being a continuation in part of my co-pending application No. 679,949, filed June 28, 1946.

Heretofore it has been the practice to utilize a micrometer gauge which requires the operator to pick up the piece and to test the same by means thereof to determine if the formed part is of greater or less dimension than that required.

By my improved gauge the operator passes formed parts between the thick base member and the movable element associated with which is a pivoted arm of comparatively long radius and movement of which causes a pointer to move across a large scale and while the piece may be under or over size by one or two tenths of a thousandth of an inch the pointer moves over the scale in which the divisions are so enlarged as to be very readily observed and read to thereby enable the operator to discard over or under size parts as they are passed on a block beneath a contact member.

These objects and features of the invention are hereinafter more fully described and claimed and the preferred embodiment of my invention is shown in the accompanying drawing in which—

Fig. 1 is an elevation showing my improved gauge.

Fig. 2 is a section taken on line 2—2 of Fig. 1.

Fig. 3 is a section taken on line 3—3 of Fig. 1.

Fig. 4 is an elevational view of an alternate form of dial construction.

Fig. 5 shows an alternative mechanism for actuating the pointer mechanism.

Fig. 6 shows another mechanism for actuating the pointer.

The gauge as herein disclosed comprises a base plate 1 on which is mounted a vertically adjustable block 2 that is secured to the base plate by means of screws 3 extending through the slots 4 and 5 provided therefor in the base plate.

The screws 3 extend into a block 2a on the rear face of the plate 1 as shown in Fig. 2 and the block 2, by loosening the screws, is vertically adjustable toward or from the work contacting element 6 which is also adjustable by means of the knurled nut 7 carried by a block 8 having a tongue 9 projecting from one edge thereof. This tongue 9 lies in a notch 10 of a greater width than the tongue permitting a limited movement of the member 8 and contact element 6. The notch 10 is formed in the plate 11 attached to the plate 1 in the structure here shown. Above the block 11 is a plate 13 having a projecting element 14 vertically above the similar element 15 secured to the upper end of the movable member 8. A spring 16 is positioned between the elements 14 and 15 tending to move the member 8 and contact element 6 toward the block 2. The member 8 carries a thin sheet steel strip 17 which is attached at its lower end to the member 8 and at its upper end is attached to the arm 18 of the pointer actuator. The actuator, as shown in Fig. 1, has an arcuate faced member 19 at its upper end. By this arrangement the finished part to be tested is positioned upon the block or anvil 2 beneath and in engagement with contact element 6, and movement of the latter in responding to the surface of the part tested will effect corresponding movements of the pointer 20 with respect to the dial 22.

The arcuate head 19 has a cord 23 attached at its opposite end to the respective pins 24 and 25 and this cord has several turns about the shaft 21 to which the pointer is secured. By movement of the member 19 in one direction or the other on its axis 26 in the block 27 the shaft is turned to thereby cause the needle to traverse the scale 22 and to thus determine whether the part is the exact size or under or over the proper dimension.

While I have shown the pivoted arm 18 as actuated by means of the thin strip of spring steel as hereinbefore described, it is within the scope of this invention to utilize the structure shown in Fig. 6 which has the contact element 6 and the knurled adjusting nut 7 as in Fig. 1. The body 8a corresponds to the body 8 in Fig. 1 but instead of the spring strip 17 utilized between the members 8 and 18 as shown in Fig. 1, I utilize the vertical arm 18a which has a portion 18b extending at an angle thereto and is further provided with an arcuate portion 28 which rides a face of the inclined portion 29 of the arm 8a.

This is a point contact between the surface 29 and 28. The arm 18a has the same function as the arm 18 of Fig. 1 and movement of the member 8a through introduction of the piece to be tested between the member 6 and the block 2 the arm 18a is caused to turn on its pivot point to thus move the member 19 in one direction or the other if the part being tested is over or under size.

A different and convenient form of indicator is shown in Figs. 4 and 5, Fig. 4 being an elevational view of the dial employed. The pointer is to be actuated by the same character of gauge mechanism shown at 6, 7 and 8 in Fig. 1. The head 19b having the arcuate face is connected to a pulley 30 which is connected by a belt or cord 31 to the pulley 32 on a shaft 33. A cord is connected to element 19b at its opposite ends and is looped around the pulley 30 whereby pivotal movement of element 19b rotates said pulley. This shaft extends through the base 34 supporting the apparatus and on the opposite end is secured a pointer 35 as shown in Fig. 4. Pivotally supported on the axis of the pointer is an indicator 35a bearing the word "under" and another indicator 35b bearing the word "over" and these are manually rotatable on the shaft 33 permitting the operator to set the indicators relative to the dial graduations to indicate over or undersize limits permissible in the product being tested. By use of these indicators the operator is enabled to instantly detect over or under sized parts and to dispose of the same and the parts that are within the set limits are passed and placed in stock.

The dial is calibrated to read in equal incremental changes in position of the contact element 6. The contact element can be set to a predetermined position by the use of over and under size precision gauge blocks. If the pointer 35 comes to rest between the indicators 35a and 35b the piece being gauged is placed in stock.

It is pointed out that while I have shown a cord 23 as providing a means for actuating the pointer it is within the scope of this invention to provide a gear on the shaft of the pointer and the arcuate surface 19a of the member 19 may be provided with complementary teeth engaging the gear.

In the structure shown in Fig. 1 I have shown a means to visibly indicate, as by an electric light, an over or under size part to thereby avoid the necessity of the operator to read the graduations on the dial. For this purpose I provide two blocks 40 and 41 on the base plate 1. Secured to each block is a spring strip 42 and on the free end of the strip is a block 43 fixed thereto and carrying contact elements 44 and 45 connected in the electric circuit 46. The contact element 45 is of greater length than the contact element 44 and the longer end of the contact element 45, in each case, is opposite the respective pins 24 and 25 of the head 19. Therefore when the head 19 is moved to the right or left on its axis it may contact the longer element 45 on the respective opposite sides of the head 19. There is a green light 47 and a red light 48 associated with block 41.

With this electrical arrangement an under or an over sized part flashes the light on one or the other sides of the arm 18 and by use of such electrical arrangement the operator is not required to carefully read the dial. Thus by use of the circuit he is instantly advised of such parts as are of over or under size. The contact element carried by the block 43 may be adjusted in position by means of the screw 49 threaded in the block 50 secured to the base member 1 and thus the long contact element 45 may be positioned nearer to or farther from the point 24 on the one side, or the point 25 on the opposite side may be positioned to contact the longer element 45.

From the foregoing description it will be realized that the workman may take formed parts from any source, as from a machine forming the same or from stock, and pass the formed parts on the upper surface of the block 2 and beneath the contacting element 6 in succession and those parts that are under or over size may be discarded and such parts as are finished within the limits required are passed from the machine to a container or otherwise as may be desired. It is believed obvious that the device is comparatively simple in character and accurate in function and that the various features and objects of the invention are attained by the structure described.

Having thus fully described my invention, its utility and mode of operation, what I claim and desire to secure by Letters Patent of the United States is:

A gauge indicator comprising an upright base, an upright actuating bar rotatably supported at its lower end upon said base in parallel spaced relation thereto, a vertically reciprocal shaft pivotally joined at its upper end to an intermediate portion of said bar, an enlarged head at the upper end of said bar, a calibrated dial plate supported upon said base in parallel spaced relation thereto, a transverse shaft journaled upon said base and projecting through and forwardly of said dial plate, a cord upon said head having its opposite end secured thereto in spaced relation, said cord having several turns thereof wound upon said shaft, whereby rotatable movement of said head and bar causes rotation of said shaft, and a pointer secured upon the outer end of said shaft in registry with said dial.

JOSEPH C. HOOVER.

REFERENCES CITED

The following references are of record in the file of this patent:

UNITED STATES PATENTS

| Number | Name | Date |
|---|---|---|
| 187,052 | Seybold | Feb. 6, 1877 |
| 407,903 | Schlatter | July 30, 1889 |
| 1,006,924 | Erb | Oct. 24, 1911 |
| 1,234,702 | Prichard et al. | July 24, 1917 |
| 1,723,390 | Tingley | Aug. 6, 1929 |
| 1,893,205 | Hughes | Jan. 3, 1933 |
| 1,894,025 | Dennison et al. | Jan. 10, 1933 |
| 2,047,408 | Emery et al. | July 14, 1936 |
| 2,139,251 | Aller | Dec. 6, 1938 |
| 2,220,040 | Hathaway et al. | Oct. 29, 1940 |
| 2,305,731 | Palmgren | Dec. 22, 1942 |
| 2,397,971 | Martinec | Apr. 9, 1946 |
| 2,434,870 | Solovieff | Jan. 20, 1948 |

FOREIGN PATENTS

| Number | Country | Date |
|---|---|---|
| 12,922 | Great Britain | June 17, 1908 |
| 73,931 | Switzerland | May 1, 1917 |
| 160,237 | Great Britain | Mar. 14, 1921 |
| 502,064 | France | Feb. 12, 1920 |
| 548,022 | Great Britain | Sept. 22, 1942 |
| 555,987 | Germany | Aug. 3, 1932 |